US012322847B2

(12) United States Patent
Gustaf

(10) Patent No.: US 12,322,847 B2
(45) Date of Patent: Jun. 3, 2025

(54) MODULAR DIPLEXER SUBSYSTEM COMPRISING AN RF MODULE AND A DIPLEXER MODULE COUPLED TO EACH OTHER, WHERE THE DIPLEXER MODULE IS REVERSIBLE

(71) Applicant: Trango Networks, LLC., Random Lake, WI (US)

(72) Inventor: Christopher A. Gustaf, San Diego, CA (US)

(73) Assignee: Trango Networks, LLC, Random Lake, WI (US)

( * ) Notice: Subject to any disclaimer, the term of this patent is extended or adjusted under 35 U.S.C. 154(b) by 0 days.

(21) Appl. No.: 18/481,831

(22) Filed: Oct. 5, 2023

(65) Prior Publication Data

US 2024/0297429 A1 Sep. 5, 2024

Related U.S. Application Data

(63) Continuation of application No. 17/233,032, filed on Apr. 16, 2021, now Pat. No. 11,811,123.

(51) Int. Cl.
*H01P 1/213* (2006.01)
*H01P 5/08* (2006.01)
(Continued)

(52) U.S. Cl.
CPC .......... *H01P 1/2138* (2013.01); *H01P 1/2131* (2013.01); *H01P 5/082* (2013.01); *H01P 5/107* (2013.01); *H01Q 21/0087* (2013.01)

(58) Field of Classification Search
CPC ....... H01P 1/2138; H01P 1/213; H01P 1/2131
(Continued)

(56) References Cited

U.S. PATENT DOCUMENTS 11,811,123 B2 11/2023 Gustaf
2001/0054940 A1 12/2001 Ishida
(Continued)

FOREIGN PATENT DOCUMENTS

EP 2375572 A1 10/2011

OTHER PUBLICATIONS

International Preliminary Report on Patentability, PCT/US2021/064629, dated Oct. 26, 2023, 8 pages.
(Continued)

*Primary Examiner* — Benny T Lee
(74) *Attorney, Agent, or Firm* — Nelson Mullins Riley & Scarborough LLP; Anthony A. Laurentano

(57) ABSTRACT

A wireless transmission system comprising a main circuit board having a first controller and a first connector assembly associated therewith; a removable and replaceable radio frequency module for transmitting and receiving wireless data, wherein the radio frequency module includes a second controller, a first module connector assembly, and a second connector assembly that is configured to couple to the first connector assembly; a removable and replaceable diplexer module for sending and receiving the wireless data at different frequencies, wherein the diplexer module includes a storage element, a first waveguide port connector, and a second module connector assembly that is configured to couple to the first module connector assembly; and a transition waveguide module having a second waveguide port connector that is configured to couple to the first waveguide port connector.

29 Claims, 11 Drawing Sheets

(51) Int. Cl.
*H01P 5/107* (2006.01)
*H01Q 21/00* (2006.01)

(58) Field of Classification Search
USPC .......................................................... 333/134
See application file for complete search history.

(56) References Cited

U.S. PATENT DOCUMENTS

| | | |
|---|---|---|
| 2003/0068985 A1 | 4/2003 | McDonald et al. |
| 2014/0170993 A1 | 6/2014 | Pescod et al. |
| 2017/0200997 A1 | 7/2017 | Gomberg |
| 2021/0111746 A1 | 4/2021 | Shimizu |
| 2022/0336939 A1 | 10/2022 | Gustaf |

OTHER PUBLICATIONS

International Search Report and Written Opinion, PCT/US2021/064629, dated Apr. 12, 2022, 15 pages.

Shen, T. et al., "Rectangular Waveguide Diplexers With a Circular Waveguide Common Port," IEEE Transactions on Microwave Theory and Techniques, IEEE, USA, vol. 51(2): (2003).

MODULAR DIPLEXER SUBSYSTEM COMPRISING AN RF MODULE AND A DIPLEXER MODULE COUPLED TO EACH OTHER, WHERE THE DIPLEXER MODULE IS REVERSIBLE

CROSS-REFERENCE TO RELATED APPLICATION

This application is a Continuation of U.S. application Ser. No. 17/233,032 filed Apr. 16, 2021, now U.S. Pat. No. 11,811,123. The disclosure of the prior application is hereby incorporated by refence in its entirety.

BACKGROUND OF THE INVENTION

The present invention is related to microwave transmission systems, and more specifically is related to modular type microwave transmission systems.

Conventional microwave transmission systems can be used to carry information digitally over known microwave frequencies ranging for example from 1 GHz to 150 GHz. The conventional microwave transmission systems typically include several major components, including for example a mainboard section with a processor and a chassis having one or more networking modems; a radio frequency (RF) section having one or more converters (e.g., upconverters and/or downconverters), a low noise amplifier, and a power amplifier; a diplexer or filtering structure; and a waveguide transition section to electrically match and/or carry the RF signal from the diplexer or combiner waveguide to the antenna. In some conventional systems, two or more RF sections can be used and the waveguide transition is replaced with a combiner, such as for example an orthomode transducer (OMT) or co-polar coupler to combine the two radio signals from the RF sections.

Due to worldwide regulatory requirements, there are many frequency bands that are available and that have different channel bandwidth, diplexer and spectral mask requirements, as well as multiple unique waveguide interfaces which are mechanically different for each band of operation. Within each frequency band there are typically sub-bands which require different diplexers with different pass bands to make the system technically feasible. For these reasons, in conventional systems, many different types of hardware components are required to make a system compliant with the local regulatory requirements as well as technically feasible for a specific frequency band. In the prior art, all these components are installed by the system manufacturer and are not changeable by the end user, with the exception of field replaceable diplexers which do not have any intelligence thereon and are commonly installed incorrectly by the end-user.

SUMMARY OF THE INVENTION

It is thus a goal of the present invention to allow the end-user to field replace or assemble the transmission system components including the radio frequency module, the diplexer/filter module, and the transition waveguide module all of which are mountable on a common mainboard section to create a modular microwave transmission system that meets the end-user network requirement. Further, the present invention forms a system that is modular in nature and ensures that the various components are correctly connected and automatically identifies the system configuration and operational limits. If invalid configurations are installed, the system can automatically detect and report that a component was improperly installed or an incorrect component was used.

An additional advantage of the present invention is that only component modules need to be held in inventory to allow sparing for a large multi band network, keeping inventory costs down significantly and speeding up the replacement process.

The present invention is directed to a wireless transmission system comprising a main circuit board having a first controller and a first connector assembly associated therewith; a removable and replaceable radio frequency module for transmitting and receiving wireless data, wherein the radio frequency module includes a second controller, a first module connector assembly, and a second connector assembly that is configured to couple to the first connector assembly; a removable and replaceable diplexer module for sending and receiving the wireless data at different frequencies, wherein the diplexer module includes a storage element, a first waveguide port connector, and a second module connector assembly that is configured to couple to the first module connector assembly; and a transition waveguide module having a second waveguide port connector that is configured to couple to the first waveguide port connector.

The wireless data can include radio frequency and microwave frequency data. Further, the diplexer module can be reversible so as to be disposed in multiple different positions. The first and second module connectors each can include a plurality of spring loaded pins.

The transition waveguide module can further include a third waveguide port connector for coupling to an antenna element, where the transition waveguide module is configured for sending the wireless data to the antenna element and for receiving wireless data from the antenna element. The transition waveguide module is movable between a first rotational position for disposing the antenna element in a first transmitting position and a second rotational position for disposing the antenna element in a second transmitting position. The diplexer module can further include a polarization sensor for sensing whether the transition waveguide module is disposed in the first rotational position or the second rotational position. The polarization sensor comprises a spring loaded pin.

According to the present invention, the second controller can store radio frequency module identification information and the storage element of the diplexer module can store diplexer module identification information. The first controller can receive the frequency module identification information and the diplexer module identification information, and based on the received identification information determine whether the radio frequency module and the diplexer module are compatible. Each of the radio frequency module identification information and the diplexer module identification information can include one or more of a module number and a serial number.

The radio frequency module receives a first transmit wireless data signal from the main circuit board having a first selected frequency in a radio frequency range. The radio frequency module can further include an upconverter unit for converting the first transmit wireless data signal having a first selected frequency into a second transmit wireless data signal having a second selected frequency that is higher than the first selected frequency, where the first selected frequency is in the radio frequency range and the second selected frequency is in the microwave frequency range. The radio frequency module can also include a downconverter unit for receiving a receive wireless data signal having a frequency in a microwave frequency range and for converting the receive wireless data signal into a second receive wireless data signal having a frequency in the radio frequency range. Each of the upconverter unit and the downconverter unit can include an oscillator element for changing the frequency of the wireless data signal.

Further, the diplexer module is reversible so as to be selectively placed in one of a high frequency filtering position or a low frequency filtering position. The diplexer module can also include a position sensor element for sensing whether the diplexer module is disposed in the high frequency position or the low frequency position. The transition waveguide module is rotationally movable between a first rotational position for disposing the antenna element in a first transmitting position and a second rotational position for disposing the antenna element in a second transmitting position. The diplexer module further comprises a sensor for sensing whether the transition waveguide module is disposed in the first rotational position or the second rotational position, where the sensor is a polarization sensor.

According to the present invention, the first module connector assembly can include a plurality of spring loaded pins and the polarization sensor can include one or more spring loaded pins. The second module connector assembly can include a first set of sensing contacts and a second set of sensing contacts, where the first set of sensing contacts is coupled to the first module connector when the diplexer module is disposed in the high frequency filtering position and the second set of sensing contacts can be coupled to the first module connector when the diplexer module is disposed in the low frequency filtering position.

The diplexer module can further include a high passband filter unit for filtering frequencies in a first frequency band and a low passband filter for filtering frequencies in a second frequency band. The first frequency band is higher than the second frequency band, and when the diplexer module is disposed in the high frequency filtering position, the high passband filter communicates with the second transmit wireless data signal, and when the diplexer module is disposed in the low frequency filtering position, the low passband filter communicates with the second transmit wireless data signal. The first set of sensing contacts and the second set of sensing contacts comprise a plurality of spring loaded pins.

The second waveguide port connector of the transition waveguide module can be configured for convert an input signal from a rectangular waveform signal to a circular waveform signal. The transition waveguide module further comprises an output circular waveguide port for communicating the circular waveform signal to an antenna element. Further, the transition waveguide module includes a main body having a top surface and an opposed bottom surface, where the bottom surface comprises a surface feature extending outwardly therefrom. The transition waveguide module is rotationally movable between a first rotational position for disposing the antenna element in a first transmitting position and a second rotational position for disposing the antenna element in a second transmitting position. The diplexer module also includes a sensor for sensing whether the transition waveguide module is disposed in the first rotational position or the second rotational position. The surface feature of the transition waveguide module is configured to engage with the sensor when the transition waveguide module is disposed in the first rotational position of the second rotational position. Further, the transition waveguide module is rotationally movable between a first rotational position for disposing the antenna element in a first transmitting position and a second rotational position for disposing the antenna element in a second transmitting position. The top surface of the main body of the transition waveguide module can include indicia for visually identifying the first rotational position and the second rotational position.

The present invention is also directed to a modular diplexer subsystem of a wireless transmission system having a radio frequency module and a transition waveguide element that includes a modular main body having mounted therein a storage element for storing selected parameters associated with the diplexer subsystem, a first waveguide port connector configured for coupling to the transition waveguide element, a module connector assembly that is configured to couple to the radio frequency module, and a sensor for sensing a rotational position of the transition waveguide module.

The main body is reversible so as to be selectively placed in one of a high frequency filtering position or a low frequency filtering position. The module connector assembly can include a first set of sensing contacts and a second set of sensing contacts, where the first set of sensing contacts is coupled to the radio frequency module to communicate information therebetween when the main body is disposed in the high frequency filtering position, and the second set of sensing contacts is coupled to the radio frequency module to communicate information therebetween when the main body is disposed in the low frequency filtering position. Each of the first set of sensing contacts and the second set of sensing contacts can include a plurality of spring loaded pins. The storage element can also store identification information of the diplexer module.

Further, the main body is reversible so as to be selectively placed in one of a high frequency filtering position or a low frequency filtering position. The main body can also include a high passband filter unit for filtering frequencies in a first frequency band and a low passband filter for filtering frequencies in a second frequency band. The first frequency band is higher than the second frequency band, and when the main body is disposed in the high frequency filtering position, the high passband filter communicates with a wireless data signal received from the radio frequency module, and when the diplexer module is disposed in the low frequency filtering position, the low passband filter communicates with the wireless data signal.

BRIEF DESCRIPTION OF THE DRAWINGS

These and other features and advantages of the present invention will be more fully understood by reference to the following detailed description in conjunction with the attached drawings in which like reference numerals refer to like elements throughout the detailed description of the different views. The drawings illustrate principals of the invention and, although not to scale, show relative dimensions.

DETAILED DESCRIPTION OF THE INVENTION

The present invention is directed to a wireless transmission system that can include one or more modular radio subsystems or modules for transmitting and receiving wireless radio frequency and microwave data. According to one embodiment, the present invention can include a full duplex wireless transmission system that employs two or more modular radio subsystems 20, where a first radio subsystem transmits data on a first frequency and the other or second radio subsystem transmits data on a second different frequency, such that data passes over and through the system simultaneously in both directions. For the sake of simplicity and for purposes of clarity, the wireless transmission system of the present invention is described and illustrated herein employing a single radio subsystem 20 although it is well understood that two or more radio subsystems can be employed and mounted or coupled to the electronic circuit board 12.

Figure 1:
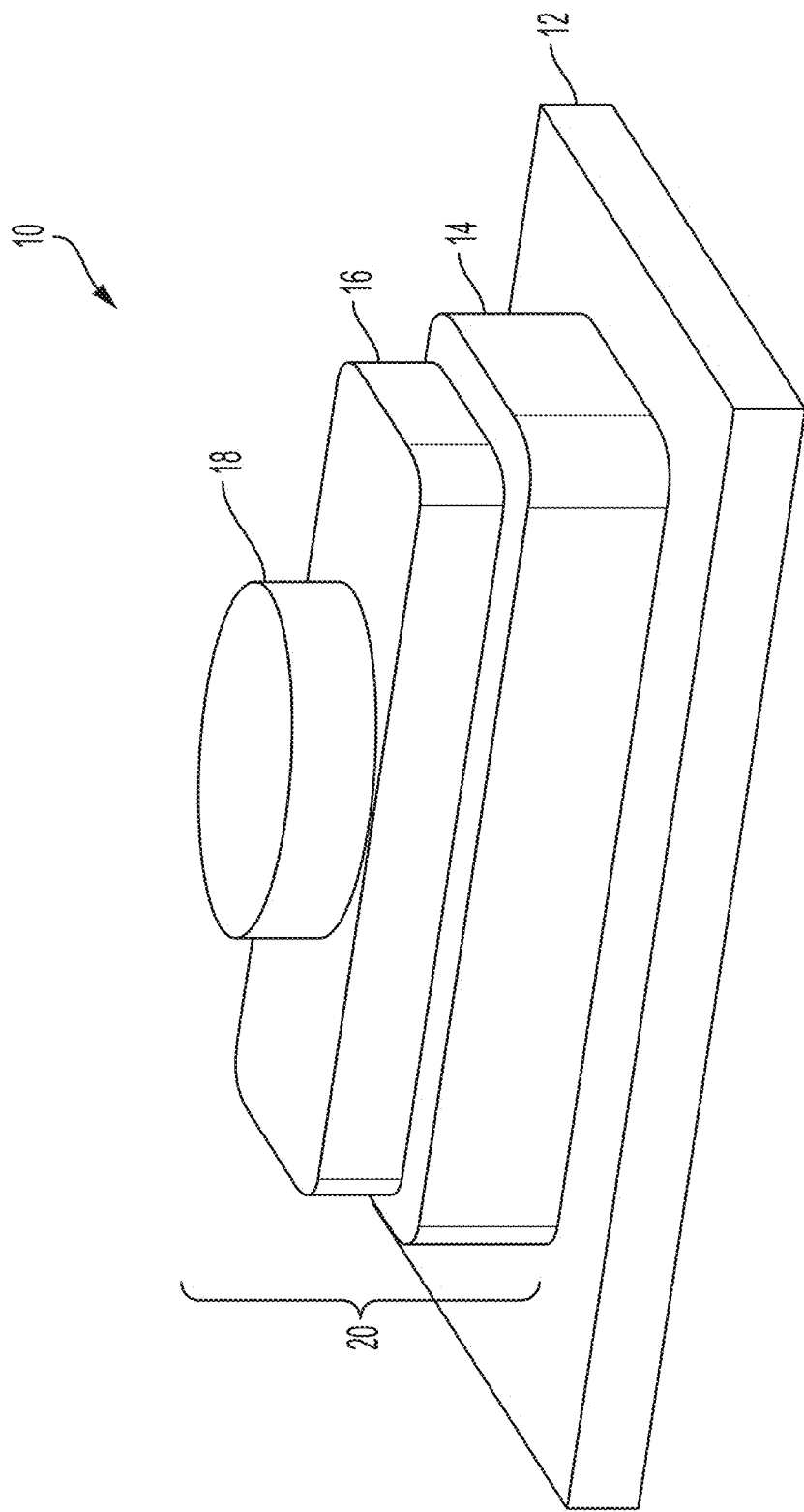
FIG. 1 is an exemplary perspective view of the wireless transmission system according to the teachings of the present invention.
Figure 2:
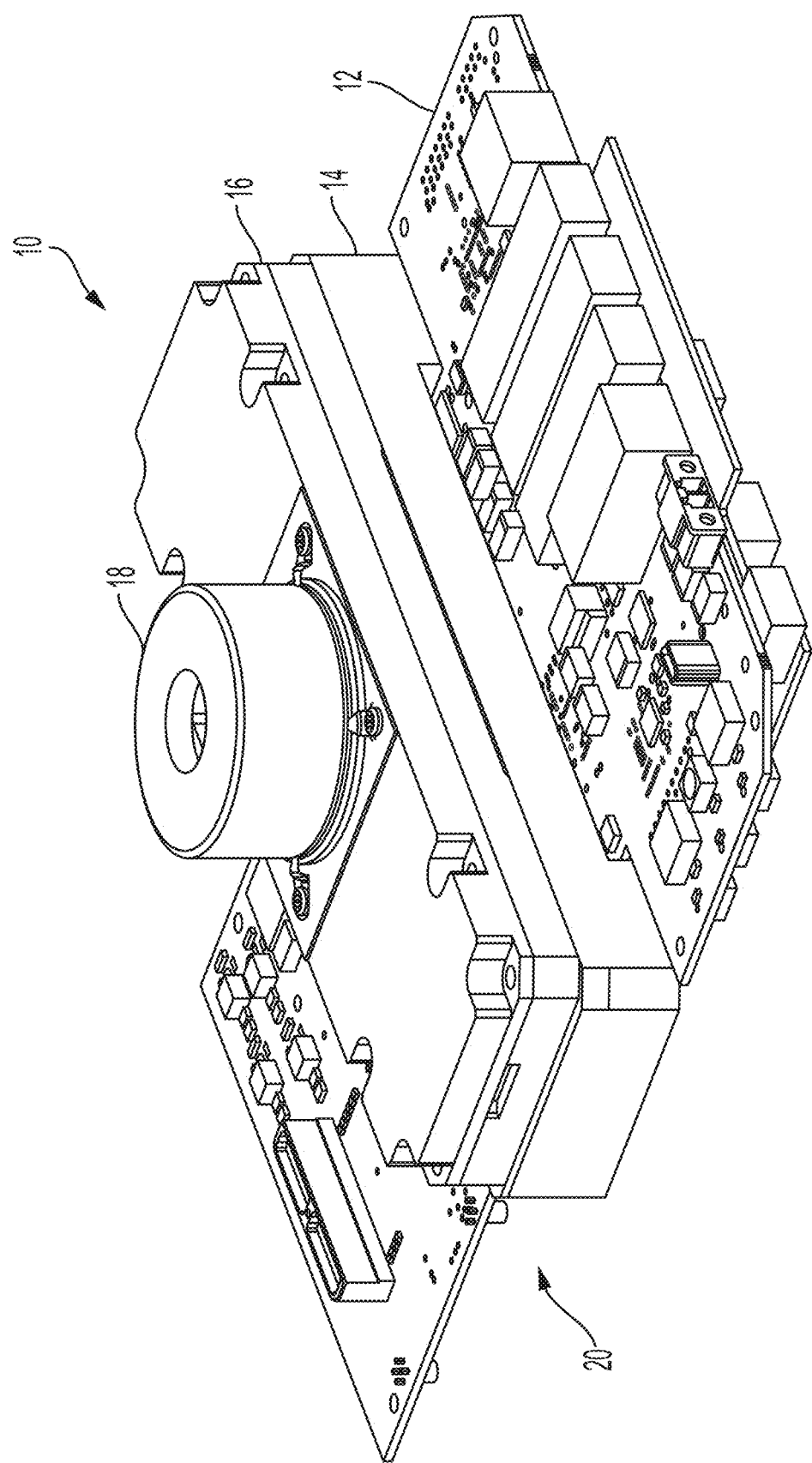
FIG. 2 is a perspective view of the components of the radio subsystem stacked on an electronic circuit board to form the wireless transmission system of the present invention.
Figure 3:
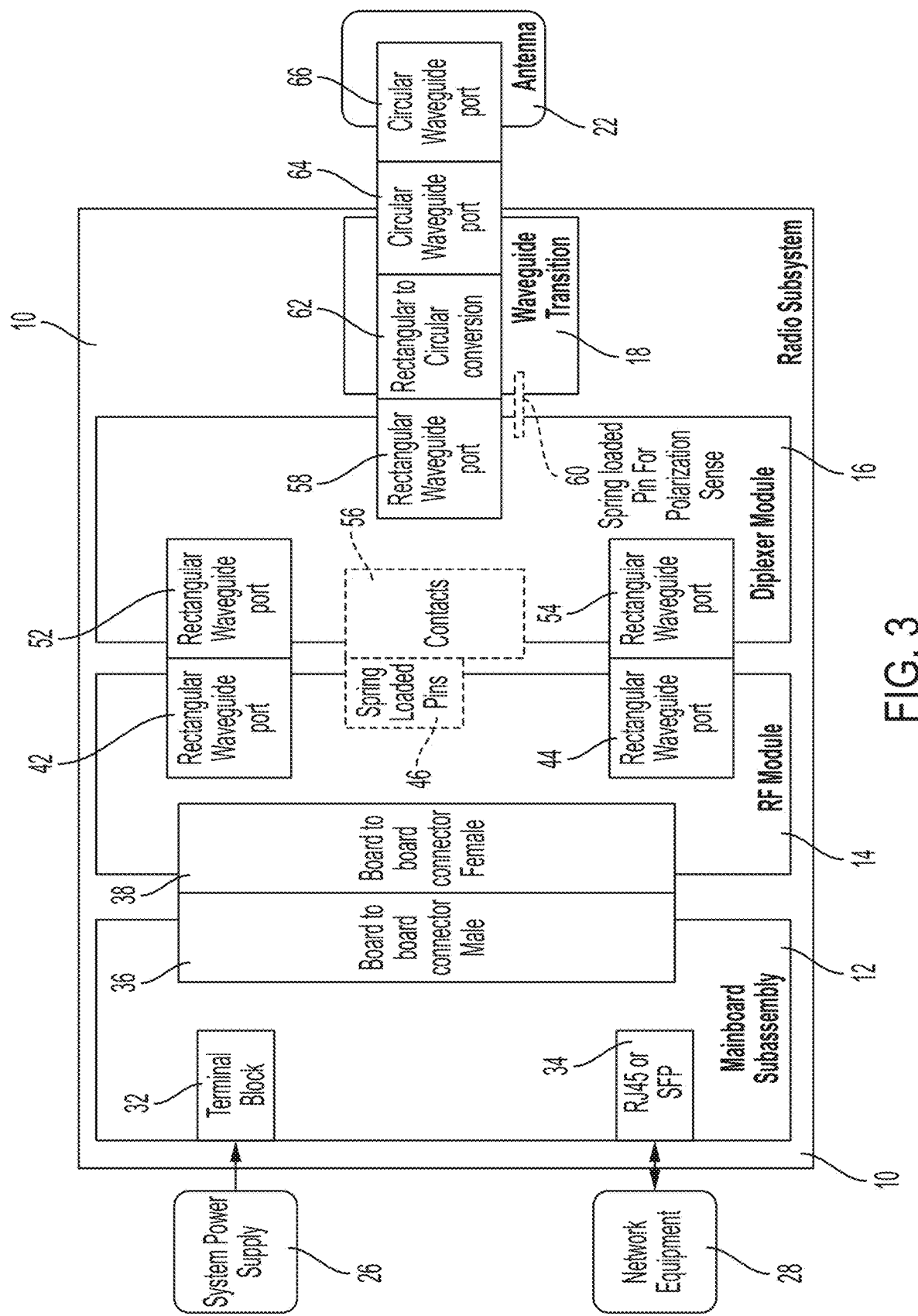
FIG. 3 is a simplified schematic view of the wireless transmission system of the present invention.

FIGS. 1-3 illustrate the wireless transmission system 10 of the present invention. The illustrated wireless transmission system 10 can include an electronic circuit board 12, such as a mainboard subassembly, as shown in FIG. 3, that has coupled thereto a radio frequency module 14, a diplexer module 16 and a transition waveguide module 18. The radio frequency module 14, the diplexer module 16 and the transition waveguide module 18 collectively form the radio subsystem 20. The transition waveguide module 18 can be coupled to an antenna component 22. As illustrated, one or more of the modules of the radio subsystem 20 can be coextensive relative to each other or can be differently sized relative to each other. The modules of the wireless transmission system 10 can be arranged relative to the electronic circuit board 12 in any selected manner, and preferably are vertically stacked on the board.

As shown in FIG. 3, the wireless transmission system 10 can be coupled to a power supply 26 that provides power to the system and to any suitable network equipment 28, as is known in the art. Specifically, the power supply 26 is electronically coupled to a terminal block 32 of the electronic circuit board 12 and selected network equipment 28 can be coupled to a connection port 34, such as an RJ45 network interface connector (e.g., 1 Gbps 802.3 at PoE) or a small form-factor pluggable (SFP) interface connector (e.g., SFP, SFP+, SFP1, SFP2, and SFP3), of the board 12. The electronic circuit board 12 can include a connector assembly 36, such as for example a male type RFM1 and/or RFM2 board to board connector assembly, that is adapted to connect to a connector assembly 38, such as a female type connector assembly, of the radio frequency module 14. The illustrated radio frequency module 14 can also include on an output side waveguide ports 42 and 44 that are adapted to connect to corresponding waveguide ports 52, 54 respectively on an input side of the diplexer module 16. The waveguide ports can be rectangular waveguide ports, although other shapes and types of waveguide ports can also be used. The illustrated radio frequency module 14 can also include a set of module connectors 46 (e.g., spring loaded pins) for connecting to selected contacts 56 of the diplexer module 16. The module connectors can be any selected type of electrical or mechanical connectors or sensors, and preferably employ spring loaded or pogo pins. The diplexer module 16 can further include on an output or antenna side a single combined waveguide port 58 that is coupled to the transition waveguide module 18. The waveguide port 58 can preferably be a rectangular waveguide port. The diplexer module 16 can also include a polarization sensor 60 for sensing the orientation or rotational position of the transition waveguide module 18, and hence the polarization of the antenna signal. The polarization sensor 60 can include any selected type or number of sensors, and preferably can include a spring loaded pin. The illustrated transition waveguide module 18 is schematically represented as having a waveguide port 62 (e.g., rectangular to circular transition) that is configured for interfacing with the waveguide port 58 of the diplexer module 16, as well as a waveguide port 64 (e.g., circular waveguide port) formed on an output or antenna side. The waveguide port 64 can be for example a circular waveguide port. The transition waveguide module 18 can interface with the antenna element 22, which includes a waveguide port 66. The waveguide port 66 can be a circular waveguide port for interfacing with the waveguide port 64 of the transition waveguide module. The transition waveguide module 18 can be shaped or configured to form the waveguide ports 62 and 64 to mechanically and electrically match the waveguide port of the diplexer module to that of the antenna element 22. The antenna element 22 can be any suitable antenna element that is configured for operation with the wireless transmission system of the present invention, such as a parabolic dish antenna. The radio frequency module 14, the diplexer module 16, and the transition waveguide module 18 can be stacked together to form the radio subsystem 20, and each of the modules can be shaped or configured to have a modular form or common form factor such that they are easily replaceable in the field.

Figure 4:
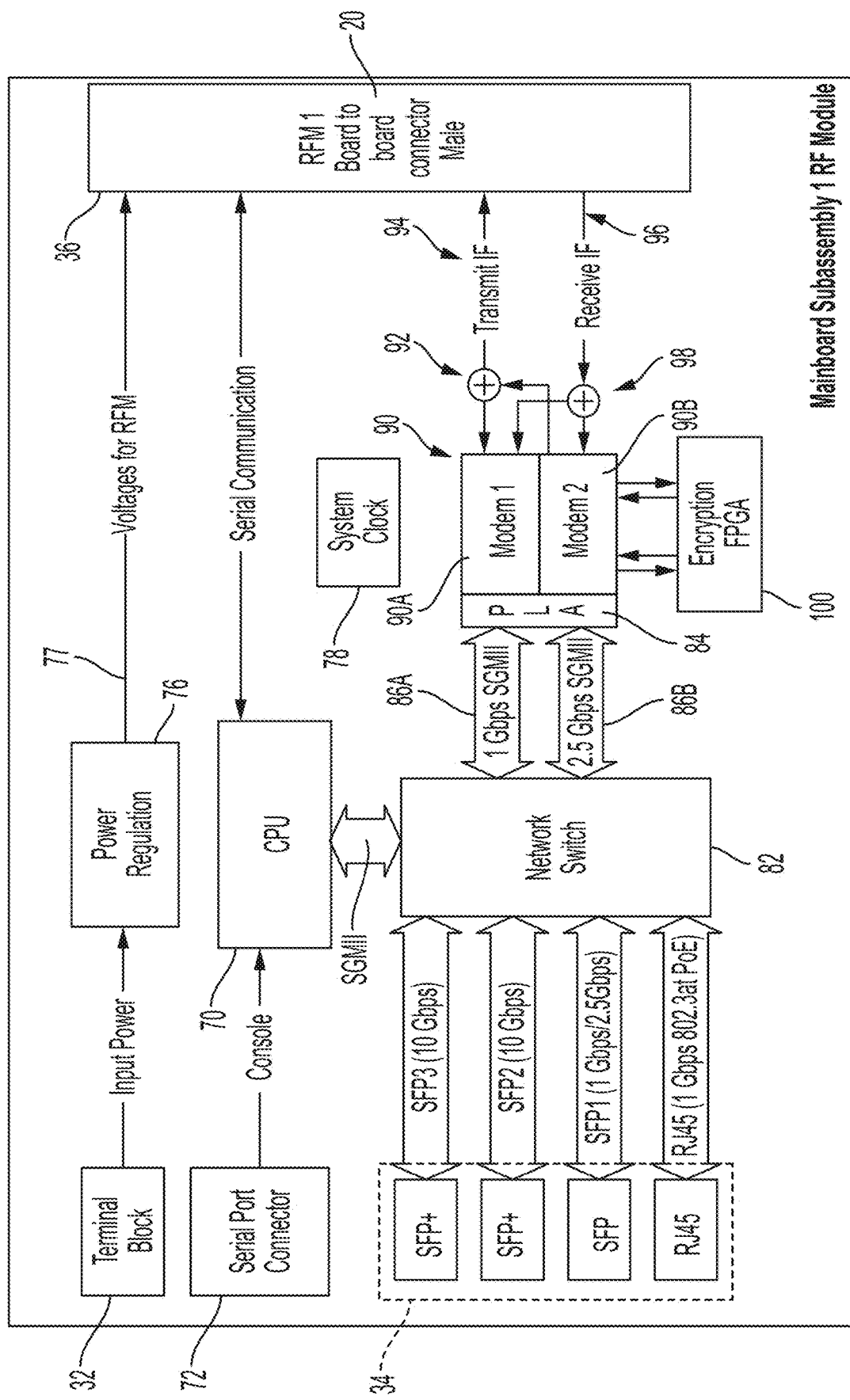
FIG. 4 is a simplified schematic view of the electronic circuit board of the wireless transmission system of the present invention.

FIG. 4 is a simplified schematic circuit representation of the electronic circuit board 12. The illustrated electronic circuit board 12 can further include at an input end an additional connector port 72, such as a serial connector port. The serial connector port is adapted to connect with a console or craft port that forms part of the network equipment connected to the wireless transmission system 10. The serial connector port 72 enables the network equipment via the craft port to provide management or control information to the radio subsystem 20. The control information is conveyed to a controller 70, such as a CPU, for processing thereby. The controller 70 can also have stored thereon selected software applications for controlling one or more components of the wireless transmission system as well as for processing the information received by the system. The controller 70 can be configured, for example, to send and receive control signals by a serial connection via the connector assembly 36. The controller 70 can include software such that when the controller software boots up, the controller 70 obtains RF and diplexer operating limits information from the radio frequency module 14 and ensures that any user specific settings for the radio subsystem 20 fall within these limits. The controller 70 can thus be employed to program one or more parameters of the system, including for example frequency limit information (e.g., transmit and receive high and low frequency limits), insertion loss information, isolation data, and the like. Specifically, when the controller 70 reads the diplexer information via the radio module 14, the controller 70 can determine the frequencies that the diplexer module 16 can transmit and receive on (e.g., filter boundaries) since that information is stored in the memory 170 on the diplexer module 16. The insertion loss information, which represents how much signal loss the diplexer module experiences at various frequency points, can also be stored in and hence read from the memory 170 to improve accuracy of the system 10. The isolation loss information represents the diplexer attenuation between transmit and receive and can be used to limit the transmit power so the system 10 does not interfere with itself. According to one practice, the diplexer module is preset to a selected amount of isolation loss, such as for example 2 dB. Further, the controller 70 can determine if the radio frequency module is compatible with the diplexer module by determining, for example, if the diplexer module 16 is not installed correctly or if the installed diplexer module 16 is not supported by the radio frequency module 14, such as by comparing identification information associated with the radio frequency module with identification information associated with the diplexer module. The radio frequency module 14 or the controller 70 can generate an error flag to notify the user of this condition.

The terminal block 32 is electronically coupled to the power supply 26 for providing input power to the electronic circuit board 12 and to the other components of the radio subsystem 20. The terminal block 32 is coupled to a power regulator 76 for regulating and providing power to the system. The power regulator 76 generates power or voltage signals 77 that are conveyed to the connector assembly 36 and that are compatible with the electrical components, for example, the RF module or RFM, of the system. The electronic circuit board 12 can also include a system clock 78 for providing clock signals to one or more of the electrical components of the wireless transmission system, as is known in the art.

The connection port 34 provides an interface to known network equipment, such as routers, switches, wireless access points, microwave systems, satellite uplink and downlink terminals, and the like. The data or information generated by the network components is transmitted over the selected interface type to a network switch 82. The switch 82 functions as a central communication point for selectively switching between input data sources. The network switch 82 is in multi-channel bidirectional communication with a physical link aggregation (PLA) unit 84. The PLA unit 84 splits the incoming traffic flow on a packet by packet basis, then transmits each packet over either modem 1 90A and modem 2 90B. The communication lines between the network switch 82 and the PLA unit 84 can provide a lower speed communication line 86A, such as for example about 1 Gbps SGMII, for providing a communication pathway to handle low, fixed latency traffic and the like, as well as a higher speed communication line 86B operating at about 2.5 Gbps SGMII for providing a communication pathway to handle the main data traffic of the electronic circuit board 12 as well as the radio subsystem 20.

The PLA unit 84 can be coupled to a modem assembly 90 that includes, according to one embodiment, multiple modems, such as for example modems 90A and 90B. The modem assembly 90, as is known, converts data from one digital format intended for communication between devices with specialized wiring into another format suitable for a different transmission medium. As such, the modem assembly 90 modulates one or more input signals (e.g., carrier wave signals) to encode digital information for transmission, and demodulates signals to decode the transmitted information. The goal of the modem assembly 90 is to produce a signal that can be transmitted easily and decoded reliably to reproduce the original digital data. The modems 90A and 90B can be any selected type of modem, and are preferably 1.1 GHz modems capable of generating digital intermediate frequency (IF) signals up to 1 GHz. The output signals of the modems 90A, 90B are combined by a combiner 92 to form the transmit IF output signal 94, which is transmitted via the connector assembly 36 to the radio subsystem 20. The information transmitted from the combiner 92 can be in the low to mid frequency range, such as between about 50 Mhz and about 1 Ghz, and preferably is transmitted in a range between about 140 MHz and about 350 MHz. Conversely, for the receive IF incoming signal 96 via the connector assembly 36, the signal 96 is transmitted to a combiner 98 that serves to combine and then split the signal 96 between the modems 90A, 90B. The modem assembly 90 can also communicate with an FPGA 100 for routing the data streams of each modem through the FPGA 100 for encrypting and decrypting the data.

The electronic circuit board 12 thus employs a dual modem mainboard section. For each modem 90A, 90B on the mainboard there is an intermediate frequency (IF) interface for transmitting and receiving data, a power input connection, and a communication interface (e.g., a universal asynchronous receiver-transmitter (UART), an inter-integrated circuit (I2C) or a serial peripheral interface (SPI)) to connect to the radio frequency module 14. The incoming payload data traffic is forwarded over the network switch 82 (e.g., serial gigabit media-independent interface SGMII), and is then divided and sent to one of two modems 90A, 90B using the PLA unit 84. The transmit IF signal generated by each modem, if on two separate IF frequencies, may be combined by the combiner 92 into the combined transmit IF signal 94 and sent to a single radio frequency module 20 which uses a single polarization of the antenna. Alternatively, each transmit IF signal 94 can be connected to a separate radio subsystem to allow using any suitable transducer, such as an ortho-mode transducer (OMT), to use two different antenna polarizations.

Figure 5:
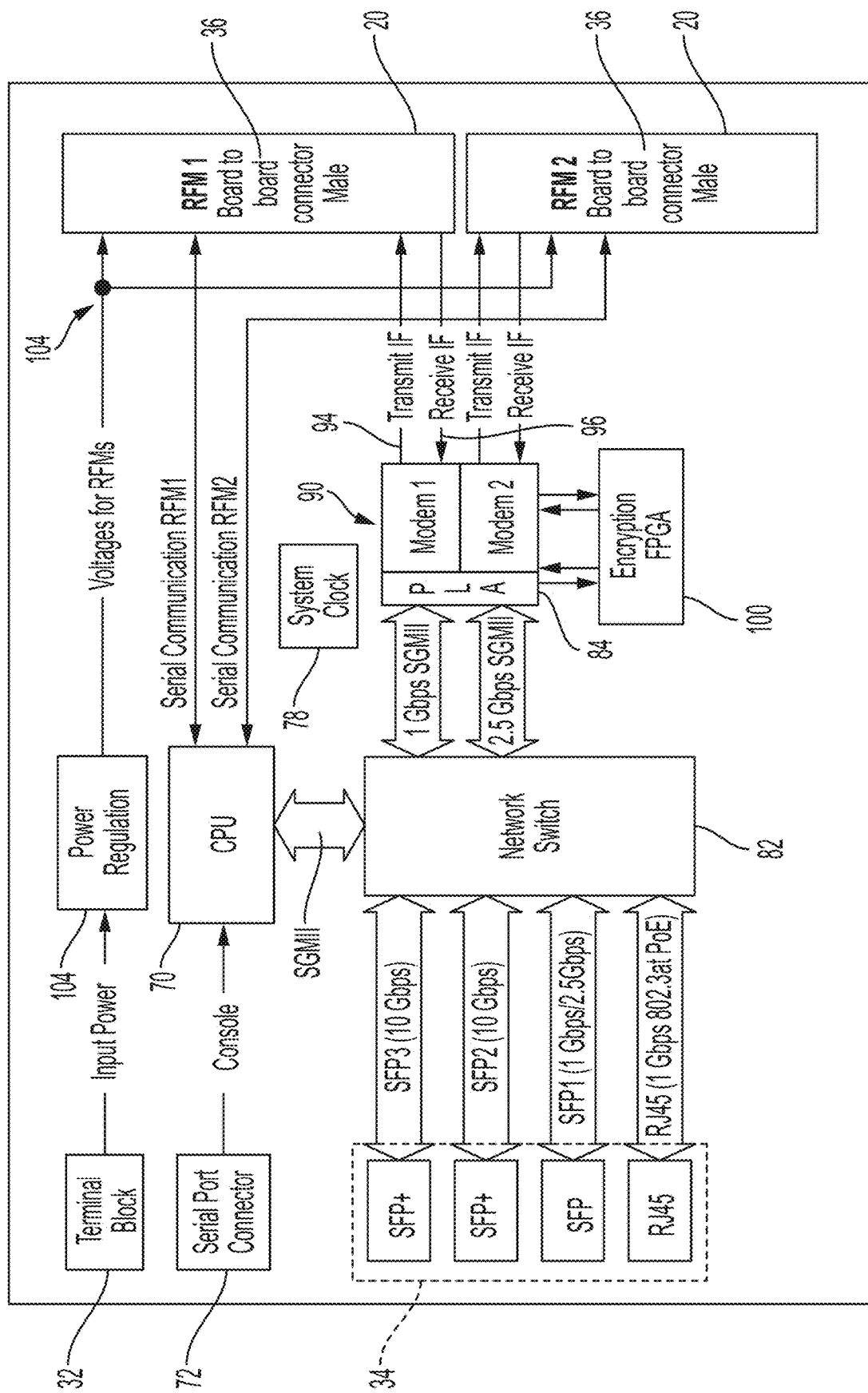
FIG. 5 is a simplified schematic view of the electronic circuit board of the wireless transmission system when employing multiple radio subsystems according to the teachings of the present invention.

FIG. 4 illustrates the associated communication pathways for exchanging data with a single radio subsystem 20 such as RF modules RFM1 and RFM2. FIG. 5 illustrates the communication pathway arrangement 104 when communicating with multiple radio subsystems 20.

Figure 6:
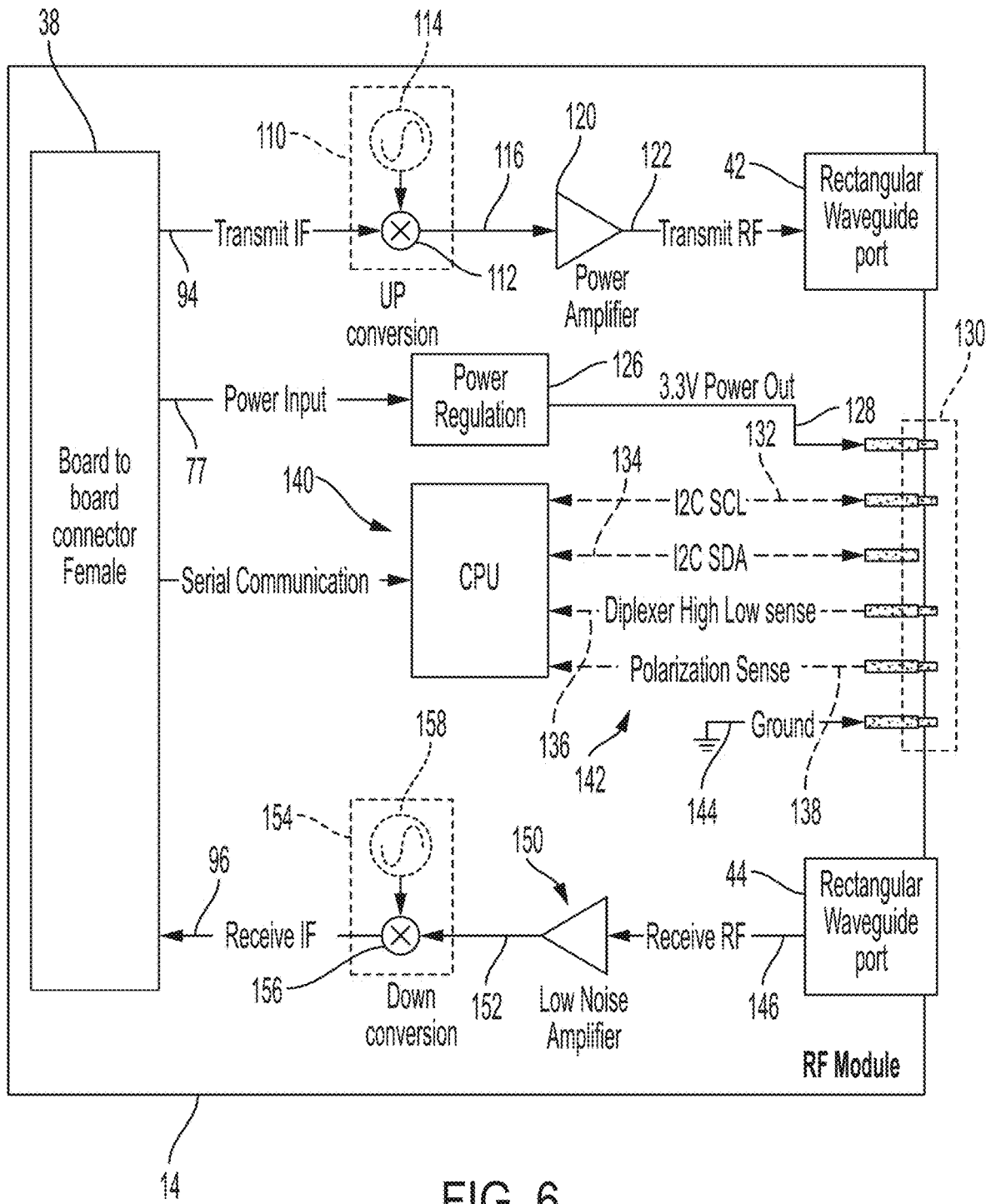
FIG. 6 is a schematic representation of the radio frequency module according to the teachings of the present invention.

FIG. 6 is a schematic representation of the radio frequency module 14 according to the teachings of the present invention. The radio frequency module 14 employs the connector assembly 38 (e.g. a female connector) that can be coupled to the connector assembly 36 (e.g. a male connector) of the electronic circuit board 12. The connector assembly 38 can allow the transmit IF signal 94 from the electronic circuit board 12 to be conveyed to an up conversion unit 110. The up conversion unit 110 is configured for converting the transmit IF signal 94 having a first selected frequency into a signal having a second higher frequency. The up conversion unit 110 can include a mixer 112 and an oscillator 114. The transmit IF signal 94 can be input to the mixer 112, and the frequency of the transmit IF signal 94 can be changed, varied or adjusted by the oscillator 114. For example, the transmit IF signal 94 can have a frequency in the low to mid frequency range (e.g., up to 1 GHZ) and the oscillator 114 can up convert the frequency of the transmit IF signal 94 to a frequency in a higher frequency range, such as for example frequencies in the microwave frequency range between about 5 GHz and about 42 GHz. The output signal 116 of the up converter unit 110 can be introduced to a power amplifier for increasing the power of the output signal 116. In response, the power amplifier 120 can generate a transmit RF output signal 122 having a higher power level associated therewith. For example, the power of the signal 116 input into the power amplifier can be about 1 mW and the power amplifier 120 can amplify the power of the output signal 122 to between about 1 W and about 2 W. The transmit RF output signal 122 generated by the power amplifier 120 can be introduced to the rectangular waveguide port 42. The rectangular waveguide port 42 is configured for transmitting to the diplexer module radio waves in the microwave frequency range. Further, the input power signal 77 can be conveyed via the connector assembly 38 to an input power regulator 126. The power regulator regulates the power supplied to the radio subsystem 20, and generates the power output signal 128 (e.g. 3.3V power out) that is conveyed to a sensor assembly 130 as one of the sensor inputs.

The illustrated radio frequency module 14 can include a separate controller 140, such as a CPU, for providing a separate and distinct level of control of one or more components of the radio subsystem 20. The controller 140 is in communication with the electronic circuit board 12 via the connector assembly 38, and can communicate with the controller 70 via a serial communication pathway (e.g., serial communication RFM1 and RFM2). The controller 140 is also in communication with the sensor assembly 130 via a number of communication pathways 142. The communication pathways 142 can include one or more inter-integrated circuit ($I^2C$ or I2C) buses or pathways that enable the controller 140 to communicate with a controller or memory device, such as the memory 170 in the diplexer module 16. For example, the communication pathways 142 can include an I2C clock (SCL) pathway 132 for communicating a clock signal from the system clock 78 to the memory 170, an I2C data (SDA) pathway 134 for exchanging data with the memory 170, a position sensor element such as a diplexer high-low sense pathway 136 coupled to a corresponding sensing pin (e.g., pogo pin of the sensor assembly 130) for sensing whether the diplexer module 16 in disposed in a high or low frequency filtering state or position, a polarization sense pathway 138 for sensing the polarization of the antenna 22 via the transition waveguide module 18, and a ground pathway 144 that is connected to ground. The pathways 142 are connected to the sensor assembly 130, which can include any selected type of mechanical or electrical sensor, and preferably includes a set of pogo or spring-loaded type pins.

The radio frequency module 14 further includes the rectangular waveguide port 44 for receiving incoming or input data via an input or receive waveguide signal, such as for example radio waves, from the diplexer module 16. The waveguide 44 thus receives an incoming receive RF signal 146 from the diplexer module 16 that is coupled to and amplified by a noise filter, such as a low noise amplifier 150, for reducing the amount or level of noise in the receive RF signal 146 and to improve the overall receive noise figures or levels. The amplifier 150 generates an output incoming signal 152 that is passed to a down converter unit 154 for down converting the frequency of the amplifier signal 152 to a frequency level that is compatible with the electronic circuit board 12. For example, similar to the up converter unit 110, the down converter unit 154 includes a mixer 156 for mixing the signal 152 with a signal generated by an oscillator 158. The resultant receive IF signal 96 is at the a different frequency then the transmit IF signal 94 that is input into the up converter unit 110 so as to avoid interference.

The radio frequency module 14 thus employs a controller 140 that stores and executes software that is capable of communicating with and reading information in the memory 170 of the diplexer module 16. The controller 140 can thus read from the memory 170 in the diplexer module 16 the minimum and maximum transmit/receive frequency limits based on information stored, for example, in a lookup table. The lookup table can also contain information about the insertion loss of the diplexer module 16 at various frequencies so as to improve the overall accuracy of the transmit power output measurement and receiver input signal level. The insertion loss of the diplexer can vary across the range of allowable frequencies by a selected amount, such as for example up to about 2 dB. Once the insertion loss amount or level is known, then the system can adjust the transmit power of the radio frequency module 14 to compensate to make the actual power output to the transition module the same for all frequencies. The controller 140 can also store identification information about the radio frequency module, such as the model number and the serial number of the module, as well as information about the transmit power (e.g., minimum and maximum values), and the transmit and receive frequency ranges (e.g., minimum and maximum values), as well as other selected radio frequency module parameters.

Further, the illustrated sensor assembly 130 functions as a communication interface between the radio frequency module 14 and the diplexer module 16 and employs an I2C interface, which can include clock and other types of bidirectional data that are electrically connected to the diplexer module 16 using spring loaded pins (e.g., pogo pins) that are capable of making contact with the diplexer module 16. The power communication pathway 128 and the ground communication pathway 144 are provided to the memory 170 using separate spring loaded pins that also make contact with the diplexer module 16.

The sensor assembly 130 can also employ a separate spring loaded pin from the RF module 14 corresponding to the diplexer high-low sense pathway 136 that is grounded in the diplexer module 16 if the diplexer is positioned with the low band in the transmit position, and is disposed in an open circuit or high state if the high band is in the transmit position. This allows the same diplexer module 16 to be used to create a transmit low band or a transmit high band radio simply by rotating the diplexer module, in plane, 180 degrees. The radio frequency module 14 can also employ another spring-loaded pin in the sensor assembly 130 that corresponds to the polarization sense pathway 138 that can be used to determine the polarization position of the transition waveguide module 18 which is mounted to the diplexer module 16. More specifically, the spring loaded pin corresponding to the polarization sense pathway 138 is in electrical communication with an electrical pad 168 formed on a circuit board 160 in the diplexer module 16 (FIG. 7), and the pad 168 is in turn electrically connected to another spring loaded pin 166 that transverses the body of the diplexer and is either disposed in an open circuit configuration or grounded by the transition waveguide module based on which polarization the transition is installed to use, FIG. 9A.

After sensing the diplexer module 16 and the transition waveguide module 18 via the spring loaded pins of the sensor assembly 130, the radio frequency module 14 can be programmed to configure the high or low band operation of the diplexer module 16 and the polarization of the antenna 22. That is, the radio frequency module retrieves selected information stored in the memory of the diplexer module 16, which includes diplexer identification information (e.g., model number and serial number), the polarization, transmit band (e.g., high or low), high and low pass band frequency ranges, and insertion loss for each pass band at the edges and midpoint of the frequency band. The controller 140 of the electronic circuit board 14 can be used to query the radio frequency module 14 to retrieve related settings and to inform the user of the configuration by for example a command line interface, web interface, or a simple network management protocol (SNMP). Further, each of the radio frequency modules can be calibrated at the factory over the entire band of operation supported by that specific model.

Figure 7:
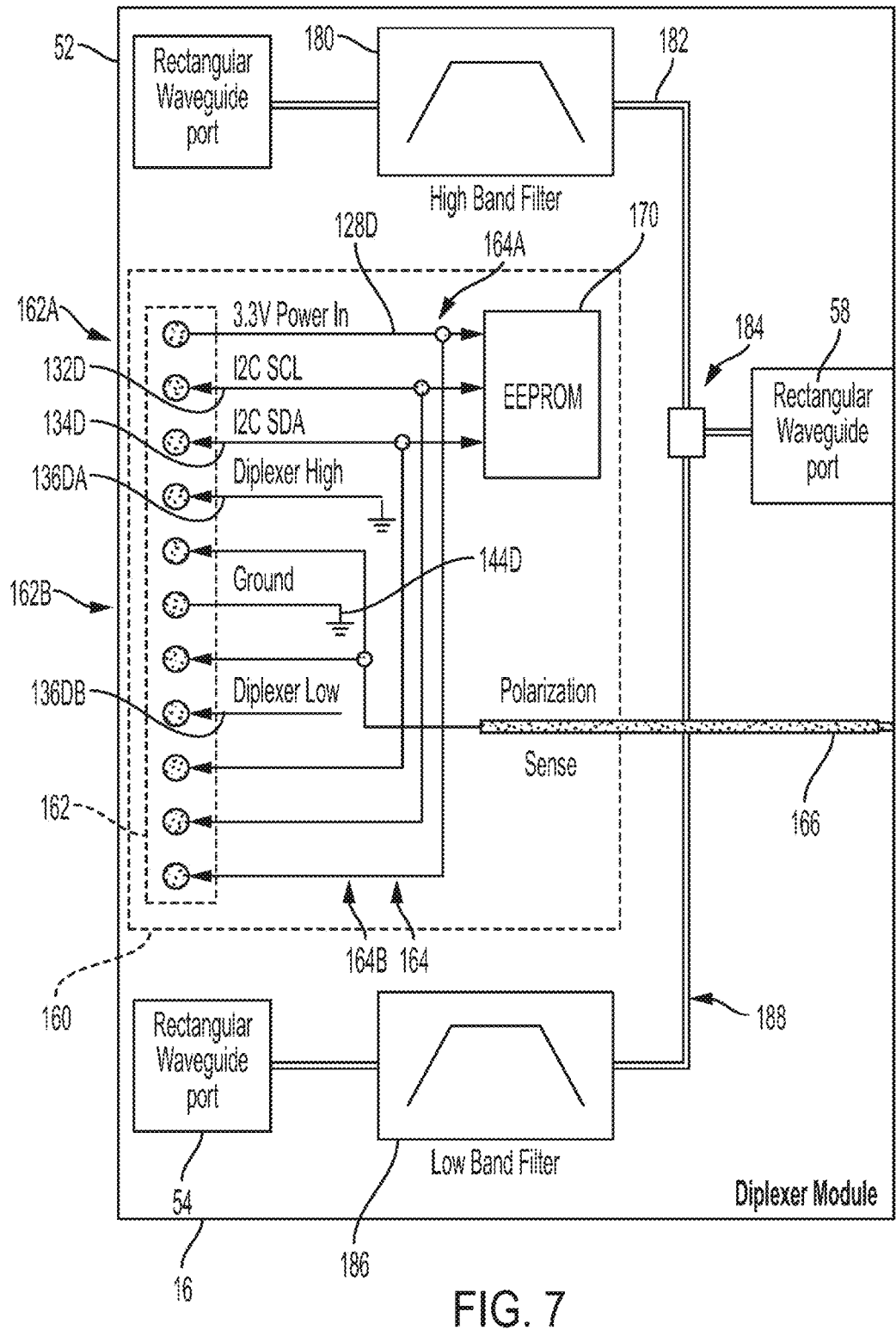
FIG. 7 is a schematic representation of the diplexer module according to the teachings of the present invention.

FIG. 7 is a schematic representation of the diplexer module 16 according to the teachings of the present invention. The illustrated diplexer module 16 includes a circuit board 160 that mounts a sensor assembly 162 that is adapted to interface and communicate with the sensor assembly 130 of the radio frequency module 14 as shown in FIG. 6. The sensor assembly 162 can include a series of electrical or sensor contacts, such as pogo or spring-loaded pins, that can be electrically coupled with the electrical contacts (e.g., pogo pins) of the sensor assembly 130. The sensor assembly 162 preferably includes two sets of common electrical or sensor contacts 162A, 162B that enable the diplexer module 16 to be disposed in first and second positions depending upon the mounting position of the diplexer module. The first set of electrical contacts in the form of pogo pins 162A are coupled to selected communication pathways 164, such as communication pathways 164A that correspond to the communication pathways 142 of the radio frequency module 14 as shown in FIG. 6. For example, the first set of communication pathways 164A includes the power output signal pathway 128D for coupling to the power signal pathway 128, the I2C clock pathway 132D for connecting to the clock pathway 132, the I2C data pathway 134D for connecting to the I2C data pathway 134, the polarization sense pathway 136DA for connecting to the polarization sense pathway 138, and the ground pathway 144D for connecting to the ground pathway 144. The polarization sense pathway 138 of the radio frequency module 14 is coupled to the circuit board 160 via the sensor assembly 162, which is turn is coupled to the polarization sensor 166. The polarization sensor 166 can sense or determine the polarization of the antenna 22 by sensing the rotational position of the transition waveguide module 18 relative to the diplexer module 16. The polarization sensor 166 can be any selected type of sensor, and is preferably a pogo or spring loaded pin type sensor. The first set of communication pathways 164A are adapted to connect with the sensor assembly 130 of the of the radio frequency module 14, via the contacts 162A, when the diplexer module 16 is disposed in a first position. In the first position, the diplexer high-low sense pathway 136 of the radio frequency module 14 is connected to the diplexer high pathway 136DA. As such, the controller 140 senses a high signal along this pathway. This high signal corresponds to a sensed first position of the diplexer module 16, where the high passband filter 180 is disposed on the transmit side of the radio subsystem 20, as shown for example in FIG. 7. If the diplexer module 16 is rotated or twisted in plane 180 degrees into a second position, then the sensor assembly 130 is disposed in contact with the second set of electrical contacts 162B, which correspond to communication pathways 164B. In the second position, the diplexer high-low sense pathway 136 is disposed in contact with the diplexer low pathway 136 DB and the controller 140 senses a low signal, which is indicative of the diplexer module 16 being disposed in the second position.

The communication pathways associated with the power 128D, clock 132D and data 134D are coupled to the memory 170. The memory 170 can be any suitable type of memory unit, and is preferably an electrically erasable programmable read-only memory (EEPROM). The memory 170 can store any selected types of identification and operational information of the diplexer module. For example, the memory 170 can store diplexer identification information (e.g., model number and serial number), the polarization of the transition waveguide module, transmit frequency band information (e.g., high or low), the high and low pass band frequency ranges, and the insertion loss for or associated with each pass band, such as for example measured at the edges and midpoint of the frequency band.

The illustrated waveguide port 52 (e.g., rectangular waveguide port) can be coupled to the waveguide port 42 of the RF module 14 on the transmit side and can communicate with a filter unit, such as a high passband filter unit 180 for passing frequencies in a higher frequency band. The output signal 182 is conveyed to a waveguide junction 184, which is in turn coupled to the output waveguide port 58 (e.g., rectangular waveguide port). Further, the rectangular waveguide port 54 is coupled to a second filter unit, such as for example a low passband filter unit for passing frequencies in a lower frequency band. The filter unit 186 is also disposed in communication with the waveguide junction 184, which is in turn coupled to the output waveguide port 58. Only a small portion of the spectrum is passed by the filters 180, 186, and the passed frequencies vary based on various regulatory requirements. For example, the low passband filter 186 passes frequencies between about 10.7 GHZ and 10.9 GHz and the high passband filter 180 passes frequencies between about 11.29 GHz and about 11.49 GHz. All other frequencies are filtered out.

Figure 9A:
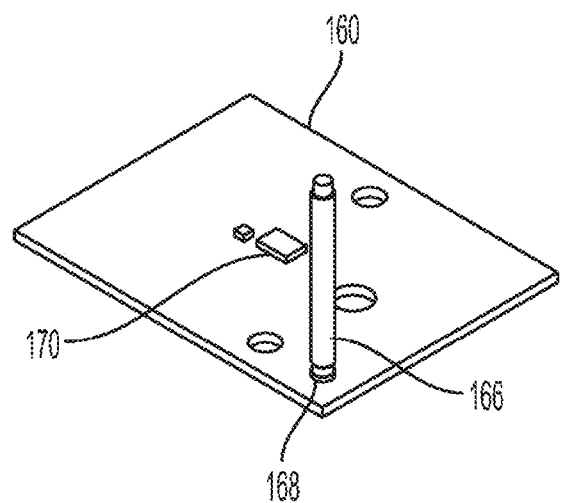
FIG. 9A is a schematic diagram of the polarization sensor employed by the diplexer module of the present invention.

As shown in FIGS. 1, 2, 7, 9A and 9B, the diplexer module 16 is primarily used to filter the transmit RF signal 122 received from the RF module 14 and the receive RF signal 188, and contains a high passband filter 180 and a low passband filter 186 which are internally connected together using waveguides as shown in FIG. 7. The diplexer module 16 is symmetric about a central axis perpendicular to a longitudinal axis of the main body such that the module can be installed onto the radio frequency module 14 with either the high passband filter or the low passband filter located over the transmitter waveguide 42. The diplexer module 16 can further include a circuit board 160 which is integrated into the body of the diplexer. The circuit board 160 has a memory unit 170 (e.g., an EEPROM) as shown in FIGS. 7 and 9A that contains selected information, such as for example diplexer identification information, including for example the model, serial number, and date code of the diplexer module 16 which can be accessed using the I2C data bus or pathway 134D that is electrically connected to the radio frequency module 14. The radio frequency module 14 provides a supply voltage via the power signal pathway 128 for providing power to the memory 170 as well as to other components, including ground, clock and data lines using spring loaded pins that touch electrical contacts or pads on the bottom of the circuit board 160. The circuit board 160 can also have a void position that indicates the physical orientation that has the higher passband frequency range, also call the High side aligned with the transmit waveguide port 42 of the radio frequency module 14.

Figure 9B:
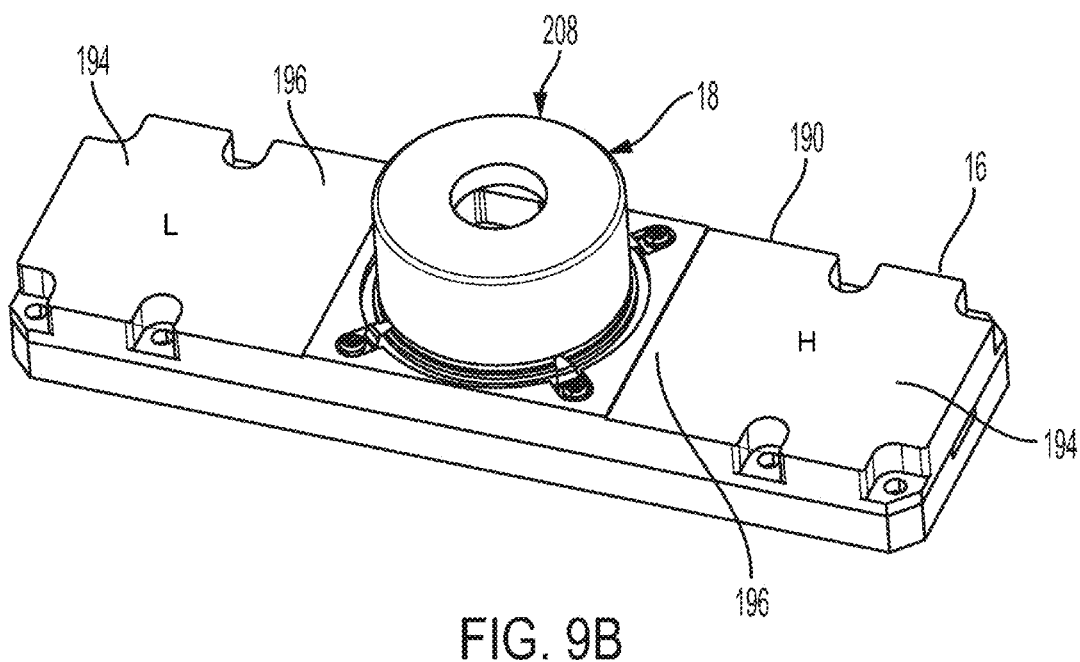
FIG. 9B is a perspective view of the diplexer module and the transition waveguide module mounted together and illustrating the various indicia that can be employed to visually determine the positions of filters and the polarization of the waveguide signal according to the teachings of the present invention.

As shown in FIG. 9B, the diplexer module 16 can have a main body 190 that can include selected indicia 194, 196 on an outer surface thereof that can be employed to visually determine the positions of filters and the polarization of the waveguide signal according to the teachings of the present invention. The indicia can include for example letters, numbers or symbols that visually provides information to a user. In the current example, the indicia 194 can include a high passband indicia H or High and a low passband filter indicia L or Low. The user can orient the diplexer module 16 such that the H or High side of the module 16 couples the waveguide port 52 with the waveguide port 42 in a first position such that the transmit signals are passed through the high passband filter unit 180 and the receive signals pass through the low passband filter 186 as shown in FIG. 7. Alternatively, the diplexer module 16 can be twisted or rotated into a second position such that the L or Low side of the diplexer module 16 couples the waveguide port 54 with the transmit waveguide port 42 in a second position such that the transmit signals are passed through the low passband filter unit 186 and the receive signals pass through the high passband filter 180. The outer surface of the main body 190 of the diplexer module can also have orientation indicia 196 formed thereon. The orientation indicia 196 can be any selected number, letter or symbol, and preferably includes a line or arrow, as shown. The orientation indicia 196 allows the user to determine the selected position or orientation of the transition waveguide module 18 when mounted thereon. This position corresponds to the polarization of the signal generated by the antenna 22.

As shown in FIG. 9A, the circuit board 160 of the diplexer module 16 can also include the polarization sensor 166, which can include a spring-loaded pin that transverses through the diplexer main body 190 (FIG. 9B) and makes contact with the transition waveguide module 18 (FIG. 9B) so as enable one or more of the controllers of the wireless transmission system 10 to determine the mechanical position of the transition waveguide module 18, which in turn is representative of the radio wave polarization (e.g., horizontal or vertical) of the antenna 22. The radio frequency module 14 can sense and detect the polarization position by way of the sensor 166 by sensing a contact or pad 168 on the circuit board 160 that is electrically connected to the sensor (e.g., spring-loaded pin). According to one embodiment, the polarization sensor 166 can sense an open circuit when the transition waveguide module 18 is disposed in a first position, which can correspond for example to a vertical polarization of the radio waves of the antenna, and the polarization sensor 166 can sense ground when the transition waveguide module 18 is disposed in a second position, which can correspond for example to a horizontal polarization of the radio waves of the antenna. The circuit board 160 thus has symmetrical electrical contacts along the centerline of the diplexer main body 190 such that the radio frequency module 14 can contact the power, I2C clock and data, polarization sense, and high/low sense pads in either the first position (e.g., 0 degree installed position) or in the second position (e.g., when rotated 180 degrees).

Figure 8:
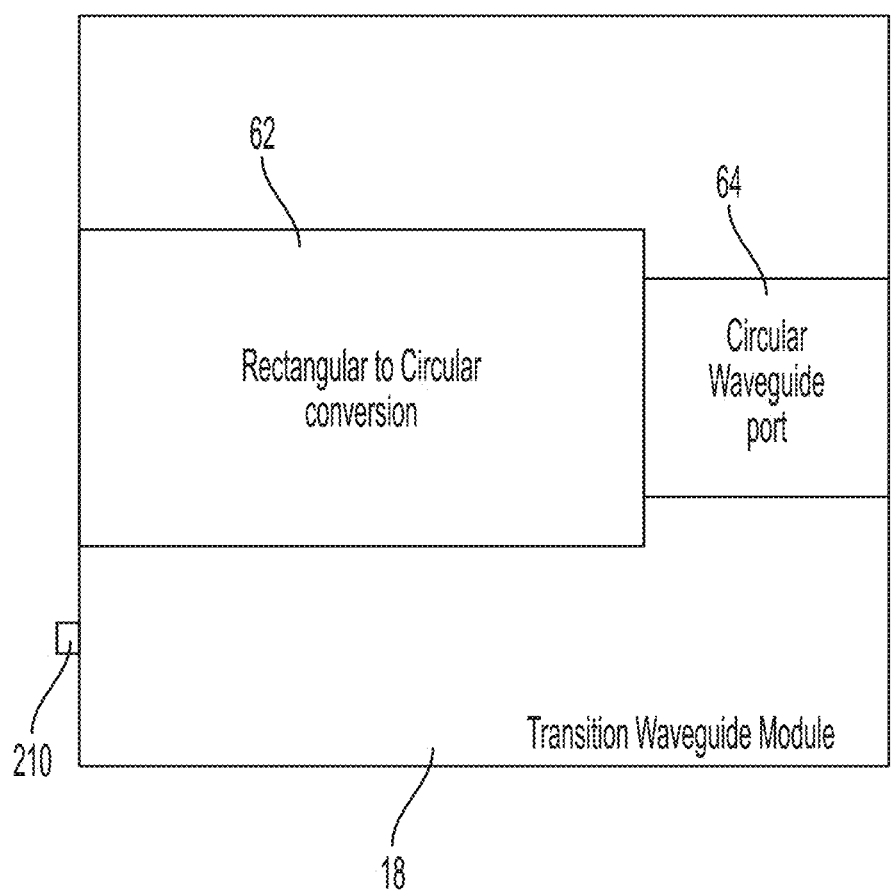
FIG. 8 is a schematic representation of the transition waveguide module according to the teachings of the present invention.
Figure 10A:
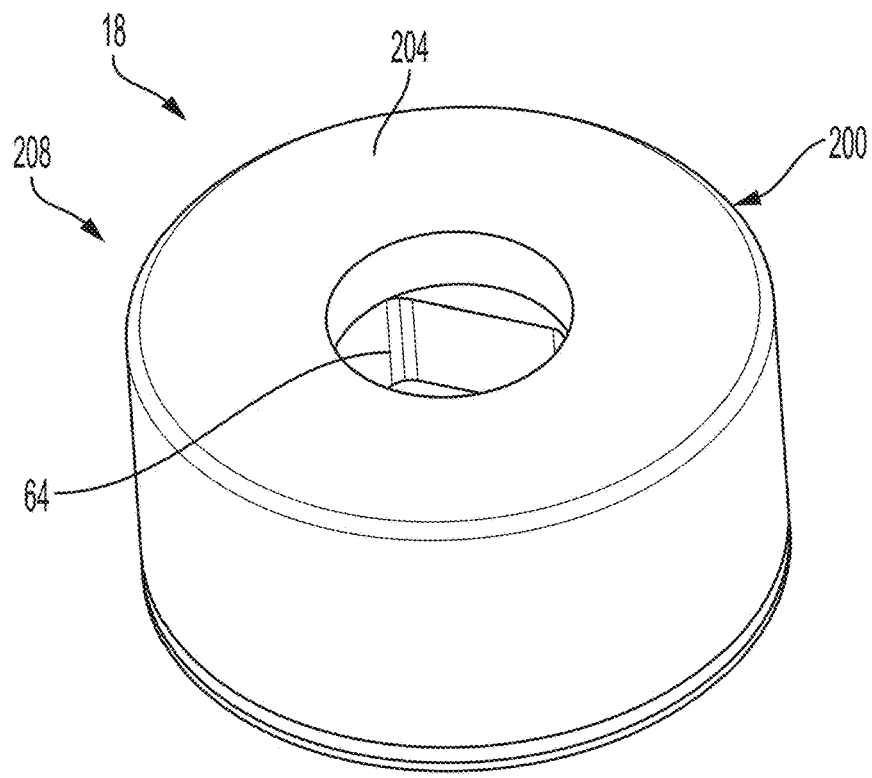
FIG. 10A is a perspective view of the transition waveguide module showing the top surface thereof according to the teachings of the present invention.
Figure 10B:
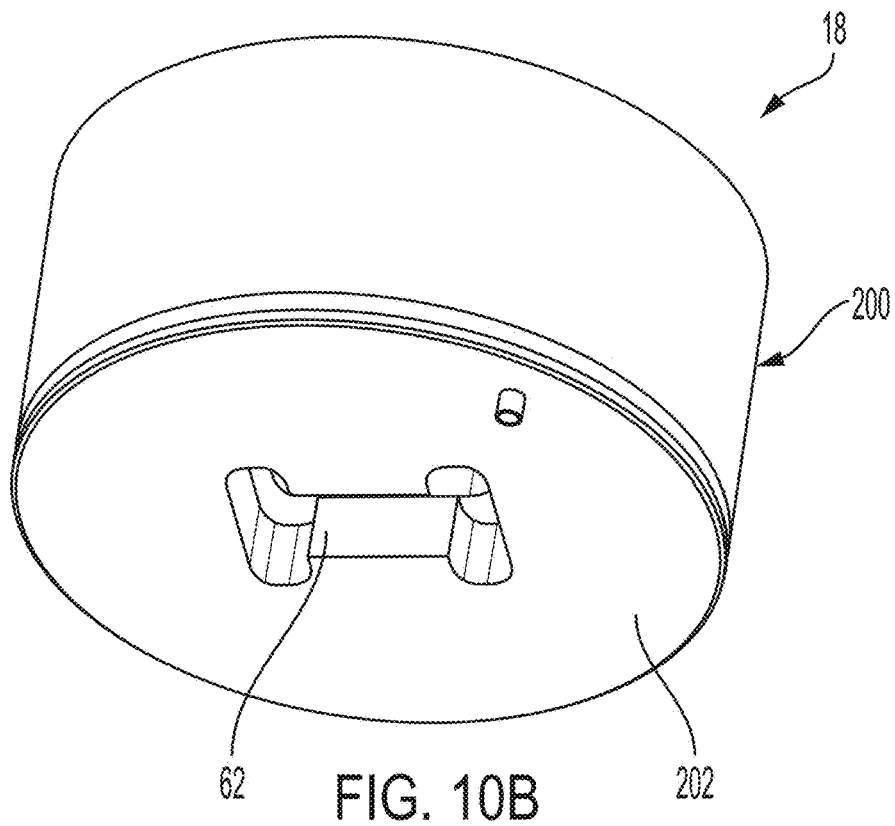
FIG. 10B is a perspective view of the transition waveguide module showing the bottom surface thereof according to the teachings of the present invention.

As shown in FIGS. 1, 8, 9B, 10A, and 10B, the transition waveguide module 18 can be mounted to the diplexer module 16 such that the waveguide port 58 of the diplexer module communicates with the waveguide port 62 (FIG. 8) on the input side of the transition waveguide module 18. The waveguide port 62 serves to receive the signals from the diplexer module 16, and in conjunction with the circular waveguide port 64 (FIG. 8) convert the signal from a rectangular wave form to a circular wave form, for subsequent introduction to the antenna element 22. The transition waveguide module 18 (FIG. 8) can include a circular main body 200 (FIG. 10A) that has a bottom surface 202 and an opposed top surface 204. The bottom surface 202 (FIG. 10B) can have the rectangular waveguide port 62 (FIG. 8) formed therein for receiving the waveguide signal from the waveguide 58 of the diplexer module 16. The input waveguide signal is then conveyed to a circular waveguide port 64 (FIG. 8) formed in the top surface 204 and disposed on the output side for converting the rectangular waveform signal to a circular waveform signal. The main body 200 can also include indicia 208 (FIG. 9B) formed on the top surface 204. The indicia 208 can include any suitable number, letter or symbol that enables the user to visually determine the rotational position of the transition waveguide module 18 (FIG. 8). According to one embodiment, the indicia 208 can include a letter V and a letter H formed on the top surface 204 and that are separated from each other along the circumference of the circular main body 200 as shown in FIG. 10A. The indicia 208 is intended to cooperate with the indicia 196 formed on the main body 190 of the diplexer module 16 to determine whether the V or the H are aligned with one of the arrows. The transition waveguide module 18 can be rotated so as to align the V or the H with one of the arrows, thus indicating whether the transition waveguide module 18 is positioned to provide signal polarization instructions to the antenna to shift the radio waves in the vertical or horizontal direction. That is, the antenna radio waves can be shifted by selecting the position of the transition waveguide module 18. Specifically, the transition waveguide module 18 can rotate or twist the orientation of the sine wave signal (e.g., the radio frequency signal), thus changing the polarization thereof. Further, the transition waveguide module 18 can be configured to interact with the polarization sensor 166 by depressing the spring loaded pin sensor when disposed in one of the positions, and not depressing the pin when disposed in the other position.

The transition waveguide module 18 is used to select which polarization that is used by the antenna 22. The user can rotate the transition waveguide module a quarter turn (e.g., 90 degrees) to change the polarization of the antenna element from vertical (V) to horizontal (H). The output of the transition waveguide module 18 is a circular waveguide signal that has an impedance that is matched to the impedance of the antenna that interacts therewith. Further, according to one embodiment, when the transition waveguide module 18 is installed on the diplexer module 16, a mechanical pin 210 (FIG. 10B) formed on the main body 200 of the transition waveguide module 18 is configured to contact the polarization sensor 166 (e.g., spring loaded pin) when the module 18 is disposed in the horizontal polarization setting H, and the pin 210 does not contact the polarization sensor when the module 18 is disposed in the vertical polarization position V. As described herein, the top surface 204 of the main body 200 of the transition waveguide module 18 can be etched to include the indicia markings 208 (FIG. 9B) showing the polarity ("V" or "H"), which when installed near alignment indicia marks 196 on the main body of the diplexer module 16 enables the user to correctly position the transition module. The transition waveguide module 18 can thus be repositioned without removing the radio cover using captive screws mounted in the transition.

In assembly and operation, the radio subsystem 20 can be mounted to the electronic circuit board 12. In this regard, the radio frequency module 14 can be mounted to the electronic circuit board 12 by connecting the connector assembly 36 to the connector assembly 38. The terminal block 32 can be coupled to the power supply 26 and the network equipment 28 can be coupled to the connection port 34. Further, selected equipment is coupled to the serial port connector 72. The power supplied to the terminal block 32 is regulated by the power regulator 76, and the regulated power is supplied to the rest of the system 10. The network equipment 28 can provide data to the modem assembly 90 which can then be conveyed to the radio subsystem 20 via the transmit RF communication pathway 94. Specifically, the incoming payload data from the network equipment can be forwarded through the network switch 32, then divided and sent to one of two modems using a Physical Link Aggregation (PLA) circuit. The transmit IF signal from each modem 90A, 90B, if on two different frequencies, may be combined via the combiner 92 and sent to a single radio subsystem 20 which uses a single polarization of the antenna 22. Alternatively, each transmit IF signal from the modems 90A, 90B can be connected to separate radio subsystems to allow for the use of two different antenna polarizations. Likewise, data can be received by the modem assembly 90 over the receive IF communication pathway 96. Once connected, the controller 140 of the radio frequency module 14 is disposed in communication with the controller 70.

Figure 11:
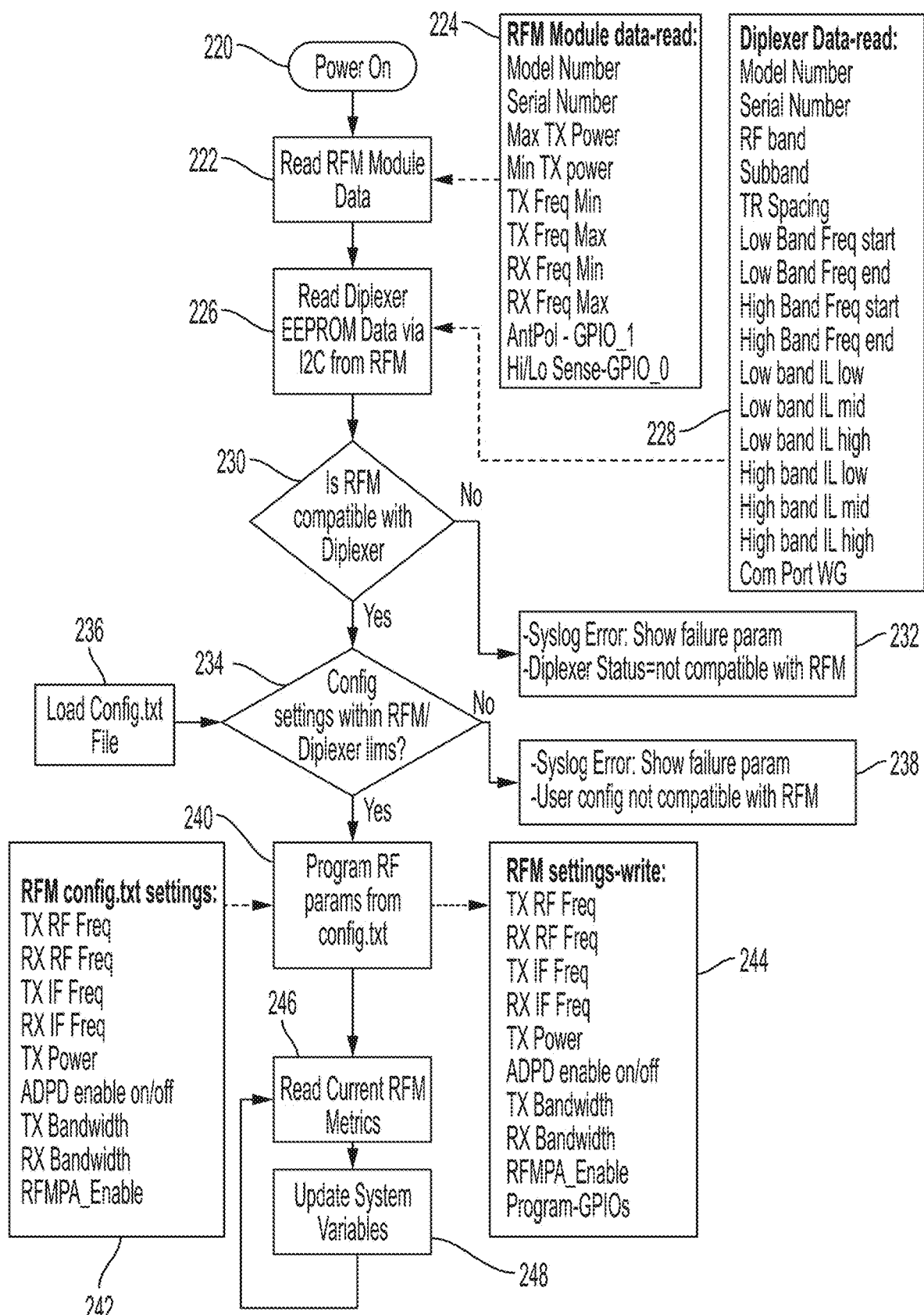
FIG. 11 is a schematic flow chart diagram illustrating the operation of the controllers of the main circuit board and the radio frequency module of the wireless transmission system of the present invention.

As shown for example in FIG. 11, when the controller 70 of the electronic circuit board 12 is powered on and boots up, step 220, the controller 70 reads selected information from the controller 140 related to the radio frequency module 14, step 222. For example, the controller 70 can receive from the controller 140 identification or radio frequency module data read information (e.g., serial number and model number) of the module 14, maximum and minimum transmit power level parameters, transmit and receive frequency data including minimum and maximum and frequency band data, diplexer related information including polarization sensor information, and various metrics such as temperature, faults, Antipol-GPIO_1, Hi/Lo Sense GPIO_0, and the like, step 224. The controller 70 can also program the radio subsystem 20 per the user requirements for transmit and receive IF/RF operating frequencies and transmit power, thus ensuring that the user set parameters are within the radio frequency module and diplexer module operating limits.

The controller 70 can also read the information stored in the memory unit 170 of the diplexer module, step 226. The information stored therein can be conveyed via the controller 140 or can be read directly therefrom by the controller 70. The memory unit 170 can store any selected types of diplexer module selected information, such as for example identification or diplexer data read information (e.g., model number and serial number), radio frequency band and sub-band information, low and high passband frequency range information (e.g., frequency start and end boundaries), insertion loss (i.e. IL) information including low, mid and high frequency point information for both the low band and the high band frequency ranges, TR spacing, Com Port WG, and the like, step 228. The insertion loss can be preset to be about 2 dB.

Further, the system 10 can be configured such that the controller 70 compares the identification information of the radio frequency module 14 and the diplexer module 16 to determine whether the modules are compatible, step 230. Specifically, the controller 70 can store various identification information regarding the RF module and the diplexer module in a look up table so as to determine if the diplexer module 16 is compatible with the radio frequency module 14 by comparing the diplexer identification information with the data in the table. As used herein, the term "compatible" is intended to mean that the radio frequency module and the diplexer module are intended to operate or work with each other without conflict or collision so as to allow the exchange of information therebetween. Thus, if the diplexer module 16 is not installed or mis-installed in the radio subsystem 20 (i.e., No), or the installed diplexer module is not supported by the radio module 14, the controller 70 or 140 can set an error signal or flag to notify the user of this condition, step 232.

Further, the controller 70 determines whether the settings within the radio frequency module 14 and the diplexer module 16 (i.e. Yes) have been properly configured or set within the ranges specified by the modules, step 234. In this regard, the controller 70 can receive a load configure file, step 236, from the base unit that employs the system 10. The load configure file can be set (i.e. No) by the user of the system. If the settings have not been properly configured or set (i.e. Yes), then the controller 70 can set a flag or other notification indicating that a configuration error exists, step 238. If the parameters have been properly set, then the controller 70 programs the settings within the file in the respective modules, step 240. For example, the configure file can include radio frequency module settings including the transmit and receive RF and IF frequencies (e.g., TX/RX RF and IF frequencies), the transmit power levels, the transmit and receive frequency ranges or bandwidth (e.g., TX/RX bandwidth), RFMPA_Enable, and the like, step 242. In response to the settings, the controller 70 can write to the controller 140 the foregoing data, step 244. The controller 70 can then read the current radio frequency module metrics, step 246, and update the system variables as needed, step 248. The RFM metrics can include the transmit and receive frequency information (e.g., RF and IF), the transmit and receive frequency bandwidth information, ADPD enable on/off status information, program input-output (GPIO) information, and the like. Further, the controller 70 can process the signals generated by polarizations sensor 166 so as to determine the polarization position of the transition waveguide module 18.

In the radio frequency module 14 as shown in FIG. 6, the transmit IF signal 94 can be passed along the corresponding communication pathway and can be passed through the up conversion unit 110 and the power amplifier 120 where the frequency and the power of the transmit IF signal is increased. The up converted and amplified signal in the form of the transmit RF output signal 122 is introduced to the waveguide port 42. The controller 140 of the radio frequency module 14 can process the data associated with the signals received from the sensor assembly 130. This data includes for example the diplexer high-low sense signal 136 to determine the position of the diplexer module 16 as well as the signals 138 (e.g., polarization sense) generated by the polarization sensor 166. The controller 140 can also receive the data from the memory 170 of the diplexer module 16, including for example model or identification information associated therewith. The controller 140 can also communicate or interface with the controller 70 to obtain user parameters to program the radio frequency module 14.

The diplexer module 16 can be mounted on the radio frequency module 14 as shown in FIG. 1 and can be disposed in one of the first or second positions relative thereto. The diplexer module 16 can be primarily used to filter the transmit and receive RF signals 122, 146. When the diplexer module 16 is disposed in the first position (e.g., a HIGH or H position), the waveguide port 52 is coupled with the waveguide port 42 and the pins of the output sensor assembly 130 are coupled to the first set of pins 162A of the sensor assembly 162. When connected in this manner, the transmit RF output signal 122 is passed through the high passband filter 180 which passes therethrough the high frequency portion of the signal 122 to form a filtered high frequency output signal 182. The high frequency output signal 182 passes through the waveguide junction 184 and is then introduced to the waveguide port 58. Further, the diplexer high electrical contact 136DA is in electrical contact with the sensor assembly 130 thus indicating that the diplexer module 16 is disposed in the first position (e.g., High position) where the high passband filter is disposed on the transmit side of the radio frequency module 14. The diplexer module 16 can be reversed or placed into a second position (e.g., a low position) where the waveguide port 54 is coupled to the waveguide port 42, such the transmit RF signal 122 is passed through the low passband filter 186. In this position, the diplexer high-low sense pathway 136 is coupled, via the sensor assembly 130, to the diplexer low pathway 136DB, thus indicating that the diplexer module 16 is placed in the Low position.

Further, the controller 140 of the radio frequency module 14 can run and execute software that reads selected identification information, as well as other types of information, that is stored in the memory 170 of the diplexer module 16. The identification information can include for example the diplexer model information. Further, the controller 140 can also program the minimum and maximum transmit/receive frequency limits that can be stored, for example, in a lookup table. The lookup table can also include information about the insertion loss of the diplexer at various frequencies to improve the accuracy of the transmit power output measurement and receiver input signal level.

The transition waveguide module 18 can be mounted on top of the diplexer module 16 as shown in FIG. 1 and can be positioned such that the polarization is changed into the horizontal or vertical direction or sense. The transition waveguide module 18 is used to select the polarization that will be employed by the antenna 22. When mounted on the diplexer module 16, the rectangular to circular waveguide converter 62 of the transition waveguide module 18 is coupled to the waveguide port 58. Further, the transition waveguide module 18 can interact with the polarization sensor 166. Specifically, the polarization sensor 166 engages with the transition waveguide module 18 when the module 18 is disposed in a first position, such as the High position, and does not engage with the transition waveguide module 18 when disposed in the second position, such as the Low position.

The transmit RF output signal 122 can be conveyed to the transition waveguide module 18 where the rectangular waveguide pattern of the signal 122 as imparted by the rectangular waveguides 42, 52, 58 on the transmit side of the radio subsystem 20 is changed to a circular waveguide pattern that better matches the antenna 22 by the rectangular to circular waveguide converter 62 and circular waveguide port 64. The output of the transition waveguide module 18 is a circular waveguide signal that is impedance matched to the antenna 22. The end-user can rotate the transition waveguide module 18 in either direction 90 degrees to change the polarization of the antenna signal from Vertical to Horizontal. The indicia 196 can be employed to help the user visually align the transition waveguide module 18 with the correct indicia mark. In transmission mode, the radio subsystem 20 can supply an electric current to the antenna 22, and the antenna 22 generates electromagnetic waves (e.g., radio waves).

In reception mode, the antenna 22 receives radio waves in order to produce an antenna input signal on the receive side of the radio subsystem 20. The antenna input signal enters waveguide port 64 and is converted to a rectangular waveguide by the rectangular to circular waveguide converter 62. The antenna input signal is then connected to the waveguide port 58 of the transition waveguide module 18 to form the antenna input signal. The antenna input signal passes through the waveguide junction 184 and is directed to the receive side of the subsystem to form the receive RF antenna signal 188. The receive RF antenna signal 188 passes through the low passband filter 186 to form the receive RF signal 146. The receive RF signal 146 passes through the waveguides 54, 44 and then passes through the noise amplifier 150 to remove unwanted noise therefrom and to amplify the signal. The signal 152 then passed through the down converter unit 154 to reduce or step down the frequency of the signal to form the receive IF signal 96. The receive IF signal 96 generated by the down converter unit 154 is then introduced to the connector assembly 38, and then via the connector assembly 36 is introduced to n the electronic circuit board 12. The receive IF signal is then introduced to the modem assembly 90 and processed thereby. The data carried in the receive IF signal 96 is then eventually processed by the controller 70.

The present invention is thus directed to a modular microwave transmission system where the diplexer module 16 has electronic means that serves to identify a model number of the diplexer, as well as means for the host radio frequency module 14 or electronic circuit board 12 to lookup the electrical parameters of the diplexer module. The system can also include means to automatically program system parameters in the controller 70 to match the installed diplexer module 16, or to notify the user if no diplexer is installed or a mismatched diplexer is installed.

The present invention also employs the diplexer high-low sense sensor or communication pathway to identify if the diplexer module 16 is installed with the high band side or the low band side on the transmit side of the radio subsystem 20. The system 10 also employs the polarization sensor 166 to determine the polarization of the transition waveguide module 18.

The diplexer module 16 also employs a memory unit 170 that stores identification information about the diplexer module, such as the model number. The controller 70 of the electronic circuit board 12 can communicate with the controller 140 and with the memory 170 to lookup selected parameters of the diplexer, and to automatically program the parameters to match the diplexer.

It is contemplated that systems, devices, methods, and processes of the disclosure invention encompass variations and adaptations developed using information from the embodiments described herein. Adaptation and/or modification of the systems, devices, methods, and processes described herein may be performed by those of ordinary skill in the relevant art.

Throughout the description, where articles, devices, and systems are described as having, including, or comprising specific components, or where processes and methods are described as having, including, or comprising specific steps, it is contemplated that, additionally, there are articles, devices, and systems of the present disclosure that consist essentially of, or consist of, the recited components, and that there are processes and methods according to the present disclosure that consist essentially of, or consist of, the recited processing steps.

It should be understood that the order of steps or order for performing certain action is immaterial so long as the disclosure remains operable. Moreover, two or more steps or actions may be conducted simultaneously. The mention herein of any publication, for example, in the Background section, is not an admission that the publication serves as prior art with respect to any of the claims presented herein. The Background section is presented for purposes of clarity and is not meant as a description of prior art with respect to any claim.

It is to be understood that the disclosed subject matter is not limited in its application to the details of construction and to the arrangements of the components set forth above or illustrated in the drawings. The disclosed subject matter is capable of other embodiments and of being practiced and carried out in various ways. Also, it is to be understood that the phraseology and terminology employed herein are for the purpose of description and should not be regarded as limiting. As such, those skilled in the art will appreciate that the conception, upon which this disclosure is based, may readily be utilized as a basis for the designing of other structures, methods, and systems for carrying out the several purposes of the disclosed subject matter.

The invention claimed is:

1. A modular diplexer subsystem of a wireless transmission system having a radio frequency module and a transition waveguide element, comprising
 a modular main body having mounted therein:
 a storage element for storing selected parameters associated with the diplexer subsystem,
 a first waveguide port connector configured for coupling to the transition waveguide element,
 a module connector assembly that is configured to couple to the radio frequency module, and
 a sensor for sensing a rotational position of the transition waveguide module,
 wherein the main body is reversable so as to be selectively placed in one of a high frequency filtering position or a low frequency filtering position, and wherein the main body further comprises
 a high passband filter unit for filtering frequencies in a first frequency band, and
 a low passband filter for filtering frequencies in a second frequency band,
 wherein the first frequency band is higher than the second frequency band, and
 wherein when the main body is disposed in the high frequency filtering position, the high passband filter communicates with a wireless data signal received from the radio frequency module, and wherein when the diplexer module is disposed in the low frequency filtering position the low passband filter communicates with the wireless data signal.

2. The modular diplexer subsystem of claim 1, wherein the main body is reversable so as to be selectively placed in one of a high frequency filtering position or a low frequency filtering position, and wherein the module connector assembly comprises a first set of sensing contacts and a second set of sensing contacts, wherein the first set of sensing contacts is coupled to the radio frequency module to communicate information therebetween when the main body is disposed in the high frequency filtering position, and wherein the second set of sensing contacts is coupled to the radio frequency module to communicate information therebetween when the main body is disposed in the low frequency filtering position.

3. The modular diplexer subsystem of claim of claim 2, wherein each of the first set of sensing contacts and the second set of sensing contacts comprise a plurality of spring loaded pins.

4. The modular diplexer subsystem of claim of claim 1, wherein the storage element stores identification information of the diplexer subsystem.

5. The modular diplexer subsystem of claim of claim 1, wherein the sensor comprises a spring loaded pin.

6. A wireless transmission system, comprising
 a main circuit board having a first controller and a first connector assembly associated therewith,
 a removable and replaceable radio frequency module for transmitting and receiving wireless data, wherein the radio frequency module includes a second controller, a first module connector assembly, and a second connector assembly that is configured to couple to the first connector assembly,
 a removable and replaceable diplexer module for sending and receiving the wireless data at different frequencies, wherein the diplexer module includes a storage element, a first waveguide port connector, and a second module connector assembly that is configured to couple to the first module connector assembly, and
 a transition waveguide module having a second waveguide port connector that is configured to couple to the first waveguide port connector,
 wherein the diplexer module is reversable.

7. The wireless transmission system of claim 6, wherein the wireless data comprises radio frequency and microwave frequency data.

8. The wireless transmission system of claim 6, wherein the first and second module connectors each comprise a plurality of spring loaded pins.

9. The wireless transmission system of claim 6, wherein the second controller stores radio frequency module identification information and the storage element of the diplexer module stores diplexer module identification information, and wherein the first controller receives the frequency module identification information and the diplexer module identification information, and based on the identification information determines whether the radio frequency module and the diplexer module are compatible.

10. The wireless transmission system of claim 9, wherein each of the radio frequency module identification information and the diplexer module identification information comprises one or more of a module number and a serial number.

11. The wireless transmission system of claim 6, wherein the radio frequency module receives a first transmit wireless data signal from the main circuit board having a first selected frequency in a radio frequency range, and wherein the radio frequency module further comprises
    an upconverter unit for converting the first transmit wireless data signal having a first selected frequency into a second transmit wireless data signal having a second selected frequency that is higher than the first selected frequency, wherein the first selected frequency is in the radio frequency range and the second selected frequency is in a microwave frequency range, and
    a downconverter unit for receiving a receive wireless data signal having a frequency in the microwave frequency range and for converting the receive wireless data signal into a second receive wireless data signal having a frequency in the radio frequency range.

12. The wireless transmission system of claim 11, wherein each of the upconverter unit and the downconverter unit comprises an oscillator element for changing the frequency of the wireless data signal.

13. The wireless transmission system of claim 11, wherein the diplexer module is reversable so as to be selectively placed in one of a high frequency filtering position or a low frequency filtering position, and wherein the diplexer module further comprises a position sensor element for sensing whether the diplexer module is disposed in the high frequency position or the low frequency position.

14. The wireless transmission system of claim 13, wherein the transition waveguide module is rotationally movable between a first rotational position for disposing the antenna element in a first transmitting position and a second rotational position for disposing the antenna element in a second transmitting position, and
    wherein the diplexer module further comprises a sensor for sensing whether the transition waveguide module is disposed in the first rotational position or the second rotational position.

15. The wireless transmission system of claim 14, wherein the sensor is a polarization sensor.

16. The wireless transmission system of claim 15, wherein the first module connector assembly comprises a plurality of spring loaded pins, and wherein the polarization sensor is a spring loaded pin.

17. The wireless transmission system of claim 13, wherein the second module connector assembly of the diplexer module comprises a first set of sensing contacts and a second set of sensing contacts, wherein the first set of sensing contacts is coupled to the first module connector when the diplexer module is disposed in the high frequency filtering position and wherein the second set of sensing contacts is coupled to the first module connector when the diplexer module is disposed in the low frequency filtering position.

18. The wireless transmission system of claim 17, wherein the diplexer module further comprises
    a high passband filter unit for filtering frequencies in a first frequency band, and
    a low passband filter for filtering frequencies in a second frequency band,
    wherein the first frequency band is higher than the second frequency band, and
    wherein when the diplexer module is disposed in the high frequency filtering position, the high passband filter communicates with the second transmit wireless data signal, and wherein when the diplexer module is disposed in the low frequency filtering position, the low passband filter communicates with the second transmit wireless data signal.

19. The wireless transmission system of claim 18, wherein the first set of sensing contacts and the second set of sensing contacts comprise a plurality of spring loaded pins.

20. The wireless transmission system of claim 19, wherein the diplexer module further comprises a storage element for storing identification information of the diplexer module.

21. The wireless transmission system of claim 6, wherein the second waveguide port connector of the transition waveguide module is configured for convert an input signal from a rectangular waveform signal to a circular waveform signal.

22. The wireless transmission system of claim 21, wherein the transition waveguide module further comprises an output circular waveguide port for communicating the circular waveform signal to an antenna element.

23. The wireless transmission system of claim 22, wherein the transition waveguide module comprises a main body having a top surface and an opposed bottom surface, and wherein the bottom surface comprises a surface feature extending outwardly from the bottom surface.

24. The wireless transmission system of claim 23, wherein the transition waveguide module is rotationally movable between a first rotational position for disposing the antenna element in a first transmitting position and a second rotational position for disposing the antenna element in a second transmitting position, wherein the diplexer module includes a sensor for sensing whether the transition waveguide module is disposed in the first rotational position or the second rotational position, and
    wherein the surface feature of the transition waveguide module is configured to engage with the sensor when the transition waveguide module is disposed in the first rotational position of the second rotational position.

25. The wireless transmission system of claim 23, wherein the transition waveguide module is rotationally movable between a first rotational position for disposing the antenna element in a first transmitting position and a second rotational position for disposing the antenna element in a second transmitting position, and wherein the top surface of the main body of the transition waveguide module includes indicia for visually identifying the first rotational position and the second rotational position.

26. The wireless transmission system of claim 6, wherein the transition waveguide module further comprises a third waveguide port connector for coupling to an antenna element, wherein the transition waveguide module is configured for sending the wireless data to the antenna element and for receiving wireless data from the antenna element.

27. The wireless transmission system of claim 26, wherein the transition waveguide module is movable between a first rotational position for disposing the antenna element in a first transmitting position and a second rotational position for disposing the antenna element in a second transmitting position.

28. The wireless transmission system of claim 27, wherein the diplexer module further comprises a polarization sensor for sensing whether the transition waveguide module is disposed in the first rotational position or the second rotational position.

29. The wireless transmission system of claim 28, wherein the polarization sensor comprises a spring loaded pin.

* * * * *